Sept. 24, 1929.         I. B. SMITH         1,729,136
AUTOMATIC CONTROL APPARATUS
Filed June 24, 1925        2 Sheets-Sheet 1
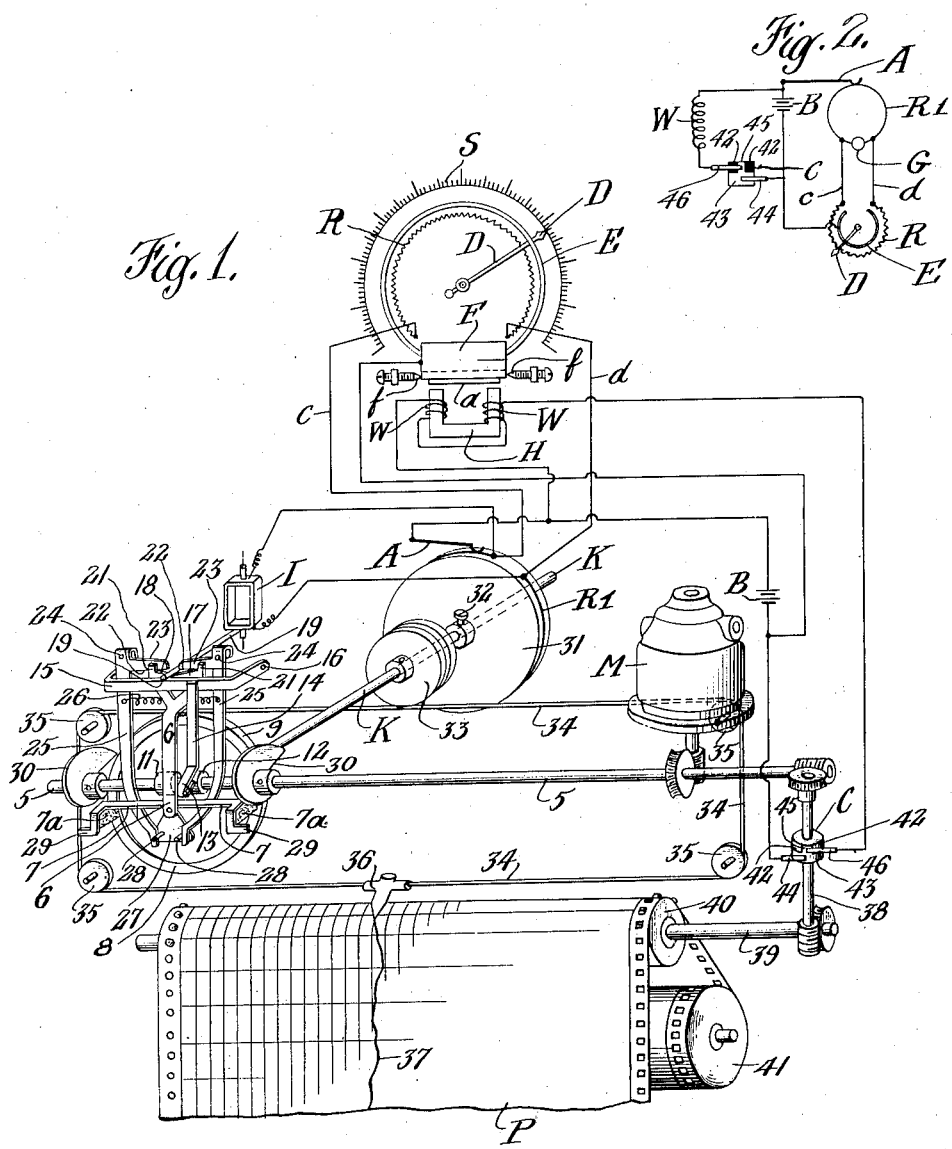
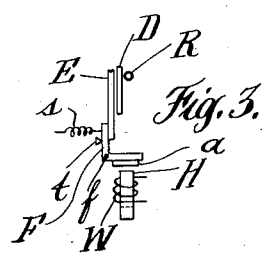
INVENTOR
Irving B. Smith
BY Cornelius L. Ehret
his ATTORNEY Sept. 24, 1929.   I. B. SMITH   1,729,136
AUTOMATIC CONTROL APPARATUS Filed June 24, 1925   2 Sheets-Sheet 2

INVENTOR
Irving B. Smith
BY Cornelius D. Ehret
his ATTORNEY

Patented Sept. 24, 1929

1,729,136

UNITED STATES PATENT OFFICE

IRVING B. SMITH, OF AMBLER, PENNSYLVANIA, ASSIGNOR TO LEEDS & NORTHRUP COMPANY, OF PHILADELPHIA, PENNSYLVANIA, A CORPORATION OF PENNSYLVANIA

AUTOMATIC CONTROL APPARATUS

Application filed June 24, 1925. Serial No. 39,315.

My invention relates to automatic control apparatus for effecting control of position of a movable member, as a rotatable shaft or equivalent, which in turn may control other devices, in response to deflection or movement of a member whose position depends upon variations in the magnitude of a condition, such as variations in magnitude of a pressure, electric current, electromotive-force or other electrical condition, or in response to changes in position of a member, such as a float upon liquid.

In accordance with my invention, the member deflecting or moving in response to changes in a magnitude is from time to time or periodically actuated to effect closure of circuit with a resistance extending along the path of movement of the deflecting member and comprised in a balancing circuit, such as a Wheatstone bridge or equivalent, including another resistance with which coacts a contact whose position relative thereto is automatically controlled by a galvanometer, the balancing movement causing movement of the controlled movable member, as a shaft or equivalent, which then in turn controls some other device, as the marker of a recorder, a valve, electric motor or the like.

Further in accordance with my invention, the source of energy of the Wheatstone bridge or equivalent balancing circuit serves also to energize a circuit, under the control of a switch or commutator, including the winding of a magnet or other suitable means for effecting at desired intervals engagement of the aforesaid deflecting member with its associated resistance.

Further in accordance with my invention, in a system of the character referred to, particularly when the deflecting member is at a distance from the control mechanism, the number of line conductors between stations is minimized, and by recourse to additional switching mechanism the electro-magnet which actuates the deflecting member and the aforesaid commutator or switch may be disposed in series with each other and the source of energy in a conjugate conductor of the bridge or system, preferably with location of the source of energy and said switch or commutator at the station of the control mechanism and location of the electro-magnet and a co-acting control switch disposed at the distant station.

My invention resides in apparatus of the character hereinafter described and claimed.

For an illustration of one or the various forms my apparatus may take, reference is to be had to the accompanying drawing, in which:

Fig. 1 is in part electrically diagrammatic and in part a perspective of the automatic control apparatus.

Fig. 2 is an elemental diagram of the electric circuit shown in Fig. 1.

Fig. 3 is a side elevational view of part of the structure of Fig. 1.

Figure 4:
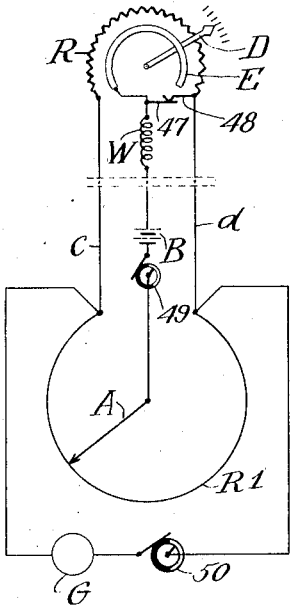
Fig. 4 is an elemental diagram of a modified form of electric circuit in accordance with my invention.

Referring to the drawing, D is the member which deflects or moves in response to changes in the magnitude of a condition, and may comprise, as indicated, a hand or needle, such as that of a Bourdon or other pressure gauge, of a galvanometer, such as a voltmeter, ammeter or the like, or of a wattmeter, or of a device indicating the position of some other member, such, for example, as a float upon liquid whose level changes.

Associated with the hand or deflecting member D may be a scale S, from which the magnitude of varying condition may be directly read. Extending along the path of movement of the member D is the resistance R, which may be in the form of a helix, and inductive or non-inductive, as may be suitable or desirable, included in a balancing circuit of any suitable type, which in the example illustrated is of the character of a Wheatstone bridge, comprising the resistance R and a resistance $R^1$, inductive or non-inductive, as may be suitable or desirable, upon which bears the contact A.

As more simply indicated in Fig. 2, the contact members A and D are included in one conjugate conductor of the bridge with the battery B or equivalent source of current. Included in this conjugate conductor is a circuit comprising the magnet winding W, the commutator or switching mechanism C, and the aforesaid battery B, which is therefore common to the Wheatstone bridge and to the magnet-energizing circuit. In the other conjugate conductor of the bridge is connected the galvanometer G.

Disposed adjacent the deflecting member or movable contact D is the arcuate conducting bar E, secured to one arm of the angle member F pivoted at $f$, and biased by spring $s$ against stop $t$, Fig. 3. Secured to the other arm of the angle member F is an armature $a$, or said other arm may itself constitute the armature, of an electro-magnet comprising the core member H energized by the aforesaid winding W.

M is an electric motor or other suitable source of power rotating the shaft 5 at substantially constant speed, comprised in a combination of the character disclosed in prior Letters Patent to Leeds No. 1,125,699. A lever 6 is pivoted at its upper end on a horizontal axis, and has pivoted thereto on a horizontal axis adjacent its lower end the arm 7, on each end of which is a shoe $7^a$, frictionally engaging the rim 8 of the clutch disk or wheel 9 secured upon the shaft K, which is the movable structure or member controlled in response to changes of position of the hand or deflecting member D, and whose movements may be utilized for controlling any other devices, such as valves, electric motors and the like, or, as indicated hereinafter, a marker or pen of a recorder. Secured upon the shaft 5 is a cam 11, which periodically engages the lever 6 and moves it outwardly, in opposition to a spring, not shown, thereby lifting the shoes $7^a$ from the rim 8, the spring returning the shoes into engagement with the rim after predetermined rotation of the cam 11. Upon the shaft 5 is secured a second cam 12, which, after the shoes $7^a$ have been lifted from the rim 8 by the cam 11, actuates the finger 13 on the lower end of the arm 14, which latter is secured at its upper end to the member 15, pivoted on a horizontal axis at 16. Upon the member 15 is secured the member 17, whose upper edge 18 is inclined outwardly from the center. Disposed above the edge 18 is the needle or pointer 19, attached to the coil I of the aforesaid galvanometer G. At the opposite ends of the member 17 are the abutments 21, limiting the deflection of the needle 19. Directly above the needle 19 and beneath which it normally freely swings are the edges 22, 22, preferably straight and horizontal, upon the members 23, 23, pivoted at 24, 24 and extending toward each other, leaving a gap of sufficient width between their inner ends for free entry of the needle when in balanced or zero position, corresponding with a balance of the aforesaid Wheatstone bridge. The needle 19 normally swings freely between the edge 18 and the members 23, 23, which latter have downwardly extending arms 25, 25, biased toward each other by the spring 26. Attached to the lower end of the arm or lever 6 is a plate 27 carrying the pins 28, 28, co-operating with the lower ends of the members 25, 25. At opposite ends of the arm 7 are the lugs 29, 29, adapted to be engaged by the cams 30, 30, similar in shape and similarly positioned and secured upon the shaft 5.

As the galvanometer needle 19 deflects in the one direction or the other, the movable structure or shaft K will be moved or rotated in the one direction or the other, and to an extent corresponding to the extent of the galvanometer deflection as fully explained in the above mentioned Leeds patent.

Secured upon the shaft K is a disk 31, of insulating material, upon whose periphery is disposed the aforesaid impedance or resistance $R^1$, which may be in the form of a helix, and with which engages the aforesaid conjugate conductor terminal or contact A. The disk 31 is adjustable to any suitable angular position upon the shaft K, to procure any suitable normal relative position of contact A with respect to the resistance $R^1$, by a set screw 32.

Secured upon the shaft K is the grooved pulley 33, around which is wrapped a cord 34, which passes over the idler rollers 35 and has attached thereto the pen or marker 36, which is exemplary of a device moved or controlled by the controlled member or shaft K. The marker 36 draws upon the record sheet or paper P a mark or record 37 representing the changes, with time, of the position of the hand or deflecting member D, and therefore of the variations of the magnitudes in response to which the member D takes its different positions.

Driven by the shaft 5 is the shaft 38, which in turn drives the shaft 39 upon which is secured the paper feed roller 40, which unwinds the paper from the storage roll 41.

Upon any suitable shaft of the structure described, as upon the shaft 38, is secured the rotatable member of the aforesaid commutator or switching mechanism C, which comprises a cylindrical member 42 of insulating material, upon which is secured the circumferentially continuous conducting ring 43, upon which continuously bears the brush 44. The ring 33 has a circumferentially narrow extension 45, upon which bears the brush 46. As the shaft 38 rotates, it will be apparent that the circuit of the magnet winding W will be periodically closed for intervals of time of suitable length, preferably generally short, though long enough to permit automatic balance of the bridge by the mechanism described.

The operation is as follows:

Periodically the circuit of the winding W is closed at the switching mechanism or commutator C. Upon each closure of this circuit the winding W of the electro-magnet is energized by current from the source B, causing it to attract its armature in opposition to the spring s, causing the presser bar E, of conducting material, in circuit with the conjugate conductor, to engage and make electrical contact with the deflecting member D, pressing it into engagement and making contact with the resistance R at a point thereon corresponding with the then position of the member D, and thereby completing the conjugate conductor path between points intermediate the ends of the resistances R and $R^1$ as established by contact A and deflecting member D.

With the conjugate conductor path so established, if the bridge is not in balance, the galvanometer needle 19 will be deflected in the one direction or the other, and to an extent which is greater as the degree of unbalance of the bridge is greater, thereby causing, by one or more cycles of the mechanism above described, the rotation of the controlled member or shaft K in corresponding direction and to an extent sufficient to rebalance the bridge by movement of the resistance $R^1$ in suitable direction and to suitable extent. Thereafter the circuit of the winding W is broken by the commutator C, and the spring s restores the presser member E to its normal position, permitting the member D to recede from contact with the resistance R and to remain free to move or deflect in the one sense or the other until subsequent closure of circuit through the winding W.

The controlled member K, in the example illustrated, effects control of position of the pen or marker 36, which accordingly produces a record curve 37 of the changes of position of the member D, and therefore of the changes of the magnitude causing its change in position.

By an arrangement of the character described, the control of position of a member, as K, and by or through it of any other device, as of the marker 36, may be effected at any desired distance from the location of the instrument of which the deflecting member or hand D is a part. In such instances the conductors c and d, comprised in the bridge, extend between the transmitting end at which is located the deflecting member D, and the controlled end of the system, at which is located the resistance $R^1$ and the mechanism controlling it. The conjugate conductor, connecting the members A and D, also in such case extends from the one station to the other, and the battery B is then located adjacent the instrument whose deflecting member is D, while the commutator or switching mechanism C is located adjacent the controlled end of the system, though it will be understood that the commutator C may be adjacent the instrument whose deflecting member is D, in which case it may be operated by clock mechanism or any other suitable means.

Figure 5:
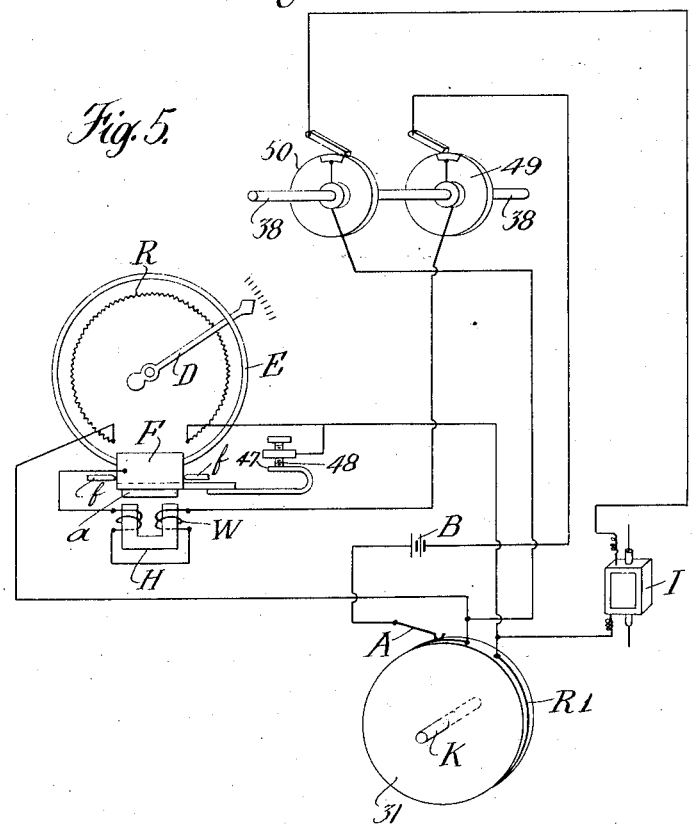
Fig. 5 is a diagram of circuit arrangement corresponding with Fig. 4 with fragmentary views of parts of the co-acting apparatus.

Referring to Figs. 4 and 5, the magnet winding W is directly in series in a conjugate conductor, and not in a branch circuit thereof, as in Figs. 1 and 2. Its one terminal connects with the presser member E and also with a contact 47 of an electric switch controlled by the magnet winding W, whose co-acting contact is 48 connected to the conductor d which, with the conductor c, when the deflecting member D and the control mechanism are at a distance from each other, constitute line conductors, the third of which is the conjugate conductor including the aforesaid winding W. In such case the source of current B is at the station of the control mechanism, together with the commutator or switch 49, corresponding with the commutator C of Figs. 1 and 2, mounted upon the shaft 38 of the control mechanism, which will be understood to be similar to that shown in Fig. 1. Movable in unison with the switch 49, and preferably mounted upon the same shaft 38 therewith, is a second switch or commutator 50 included in the second conjugate conductor with the coil I of the galvanometer G.

The switch contact 47 is carried by and in electrical communication with the lower arm of the angle member F, to which is secured the magnet armature a, whereby when the magnet is energized to cause the member E to engage and contact with the deflecting member D and bring it into contact with the resistance R, the contact 47 separates from the co-acting contact 48, leaving the circuit of the conjugate conductor including the source of energy B and the winding W closed, through the members E, D and R, until the switch or commutator 49 later opens the circuit.

At the end of the period that the winding W is deenergized, the switch or commutator 49 closes circuit, thereby energizing winding W through the now closed switch 47, 48, causing members E, D and R to come into electrical communication with each other, and the switch contacts 47 and 48 separate from each other when the member F has been moved to such position by the electro-magnet as to cause electrical contact between the members E, D, and D, R, retaining the magnet energized.

After the switch 47, 48 opens, but while circuit is closed through the commutator or switch 49, the switch 50 closes, thereby closing the circuit of the conjugate conductor including the galvanometer coil I, whereupon the galvanometer will cause a rebalancing of the circuits and mechanism as described in connection with Fig. 1. Thereafter, the switches 49 and 50 open their respective circuits, the magnet winding W being deenergized by opening the switch or commutator 49, and thereby again closing the switch 47 and 48, which is without effect to energize the magnet winding W until the commutator or switch 49 again closes circuit.

By an arrangement of this character, the galvanometer circuit is left open until after the switch 47, 48 has opened, and in consequence, the galvanometer will not be subjected to a serious deflection or unbalance. Then while the commutators or switches 49 and 50 are closed, switch 47 and 48 being opened, the mechanism automatically rebalances the bridge circuit, and in so doing effects a control of the control member K, which in turn may control a marker, as in Fig. 1, or any other suitable device as above indicated.

What I claim is:

1. The combination with a Wheatstone bridge, of electro-magnetic means controlling closure of circuit through a conjugate conductor of said bridge, a source of current in said conjugate conductor common to said bridge and said electro-magnetic means, and a switch controlled by said electro-magnetic means through which it is energized when effecting closure of said circuit through said conjugate conductor.

2. The combination with a Wheatstone bridge, of electro-magnetic means controlling closure of circuit through a conjugate conductor of said bridge and included in series in said conjugate conductor, a source of current in said conjugate conductor in series with said electro-magnetic means, and a switch controlled by said electro-magnetic means through which it is energized when effecting closure of said circuit through said conjugate conductor.

3. The combination with a Wheatstone bridge, of electro-magnetic means controlling closure of circuit through a conjugate conductor of said bridge, a source of current in said conjugate conductor common to said bridge and said electro-magnetic means, a switch controlled by said electro-magnetic means through which it is energized when effecting closure of said circuit through said conjugate conductor, and switching mechanism controlling periodic energization of said electro-magnetic means.

4. The combination with a Wheatstone bridge, of electro-magnetic means controlling closure of circuit through a conjugate conductor of said bridge, a source of current in said conjugate conductor common to said bridge and said electro-magnetic means, a switch controlled by said electro-magnetic means through which it is energized when effecting closure of said circuit through said conjugate conductor, and periodically operated switching mechanism in series in said conjugate conductor.

5. The combination with a Wheatstone bridge, of electro-magnetic means controlling closure of circuit through a conjugate conductor of said bridge, a source of current in said conjugate conductor common to said bridge and said electro-magnetic means, a switch controlled by said electro-magnetic means through which it is energized when effecting closure of said circuit through said conjugate conductor, a galvanometer controlled by said bridge and mechanism controlled by said gavanometer for balancing said bridge.

6. The combination with a Wheatstone bridge, of electro-magnetic means controlling closure of circuit through a conjugate conductor of said bridge, a source of current in said conjugate conductor common to said bridge and said electro-magnetic means, a switch controlled by said electro-magnetic means through which it is energized when effecting closure of said circuit through said conjugate conductor, periodically operated switching mechanism independent of said electro-magnetically controlled switch in series in said conjugate conductor, a galvanometer controlled by said bridge, a source of power, and mechanism actuated by said source of power under control of said galvanometer, said source of power effecting periodic actuation of said switching mechanism.

7. The combination with a Wheatstone bridge, of electro-magnetic means controlling closure of circuit through a conjugate conductor of said bridge, a source of current in said conjugate conductor common to said bridge and said electro-magnetic means, a switch controlled by said electro-magnetic means through which it is energized when effecting closure of said circuit through said conjugate conductor, a galvanometer in the other conjugate conductor of said bridge, and switching mechanism independent of said electro-magnetically controlled switch in series in said second conjugate conductor effecting closure of circuit therethrough after said first named switch opens.

8. The combination with a Wheatstone bridge, of electro-magnetic means controlling closure of circuit through a conjugate conductor of said bridge, a source of current in said conjugate conductor common to said bridge and said electro-magnetic means, a switch controlled by said electro-magnetic means through which it is energized when effecting closure of said circuit through said conjugate conductor, a galvanometer in the other conjugate conductor of said bridge, a source of power, mechanism actuated by said source of power under control of said galvanometer, and switching mechanism independent of said electro-magnetically controlled switch actuated by said source of power to close the circuit of said second conjugate conductor after said first named switch opens.

9. The combination with a Wheatstone bridge, of electro-magnetic means controlling closure of circuit through a conjugate conductor of said bridge, a source of current in said conjugate conductor common to said bridge and said electro-magnetic means, a switch controlled by said electro-magnetic means through which it is energized when effecting closure of said circuit through said conjugate conductor, switching mechanism periodically closing circuit through said conjugate conductor and remaining closed after said first named switch opens, a galvanometer in a second conjugate conductor of said bridge, and switching mechanism independent of said electro-magnetically controlled switch controlling closure of circuit through said second conjugate conductor after said first named switch opens and while said first named switching mechanism is in closed circuit position.

10. The combination with a Wheatstone bridge, of electro-magnetic means controlling closure of circuit through a conjugate conductor of said bridge, a source of current in said conjugate conductor common to said bridge and said electro-magnetic means, a switch controlled by said electro-magnetic means through which it is energized when effecting closure of said circuit through said conjugate conductor, switching mechanism periodically closing circuit through said conjugate conductor and remaining closed after said first named switch opens, a galvanometer in a second conjugate conductor of said bridge, switching mechanism independent of said electro-magnetically controlled switch controlling closure of circuit through said second conjugate conductor after said first named switch opens and while said first named switching mechanism is in closed circuit position, a source of power, and mechanism actuated by said source of power under control of said galvanometer to balance said bridge, said source of power actuating both said switching mechanisms.

IRVING B. SMITH.